(12) United States Patent
Ortmann et al.

(10) Patent No.: US 7,676,313 B2
(45) Date of Patent: Mar. 9, 2010

(54) TARGET SPEED CONTROL STRATEGY FOR POWER-OFF SHIFTS IN A HYBRID ELECTRIC VEHICLE

(75) Inventors: Walt J. Ortmann, Saline, MI (US); Andrew J. Silveri, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 675 days.

(21) Appl. No.: 11/580,319

(22) Filed: Oct. 12, 2006

(65) Prior Publication Data

US 2008/0090697 A1 Apr. 17, 2008

(51) Int. Cl.
*H02P 17/00* (2006.01)
(52) U.S. Cl. .................. 701/64; 701/61; 701/55; 477/15
(58) Field of Classification Search .......... 701/51, 701/54, 55, 58, 60, 61, 64; 477/107, 108, 477/15–17
See application file for complete search history.

(56) References Cited

U.S. PATENT DOCUMENTS

| | | | |
|---|---|---|---|
| 5,979,257 A | 11/1999 | Lawrie | |
| 6,019,699 A | 2/2000 | Hoshiya et al. | |
| 6,319,168 B1 | 11/2001 | Morris et al. | |
| 6,600,980 B1 | 7/2003 | Kraska et al. | |
| 6,694,241 B2* | 2/2004 | Kim | 701/55 |
| 6,716,126 B2 | 4/2004 | Bowen | |
| 7,447,584 B2* | 11/2008 | McMullen | 701/64 |

FOREIGN PATENT DOCUMENTS

| | | |
|---|---|---|
| JP | 200403219 | 7/2004 |
| WO | WO2005/025911 | 3/2005 |

* cited by examiner

*Primary Examiner*—Richard M. Camby
(74) *Attorney, Agent, or Firm*—David B. Kelley; MacMillan, Sobanski & Todd, LLC

(57) ABSTRACT

A method for controlling a power-off shift from a current gear to a target gear in a hybrid electric powertrain including an engine, electric motor and automatic transmission includes the steps of determining an initial target speed for the current gear, operating the motor at the initial target speed, repetitively determining a current gear ratio, a output shaft speed during the gear ratio change, a time rate of change of output shaft speed, using the current gear ratio, the current speed of the output shaft and the time rate of change of output shaft speed repetitively to determine a current target speed, and operating the motor at the current target speed until a gear change to the next gear is completed.

13 Claims, 5 Drawing Sheets

TARGET SPEED CONTROL STRATEGY FOR POWER-OFF SHIFTS IN A HYBRID ELECTRIC VEHICLE

BACKGROUND OF THE INVENTION

1. Field of the Invention

This invention relates generally to a hybrid electric vehicle whose powertrain includes an electric motor, engine and automatic transmission, particularly to controlling gear ratio changes produced by the transmission.

2. Description of the Prior Art

In some modern power transmissions for motor vehicles there exists a strategy to improve closed pedal/throttle shifting. A "closed pedal" or "closed throttle" condition is sometimes referred to a power-off condition, in which the vehicle's accelerator pedal is not depressed by the vehicle operator or the engine throttle is closed. During such shifting, the control strategy requests a desired engine speed that matches synchronous speed in the next gear during a shift event. The engine speed request is an input to a torque control strategy that adjusts spark timing, mass air flow into the engine, fuel flow, and other engine parameters via closed loop, feedback to provide the requested output. Controlling engine speed to the next gear synchronous speed during shift events causes the transition to the next gear to occur faster and smoother.

Closed pedal/throttle shifting includes minimum pedal (coast down) downshifts and coasting upshifts. Minimum pedal downshifts occur when the vehicle is coasting and the vehicle's speed is less than the speed scheduled for a downshift at closed throttle or pedal. Each coast downshift in a vehicle having an automatic transmission requires smooth deceleration since a slight disturbance in the driveline is very noticeable. Coasting upshifts occur when the driver backs out of a tip-in of the accelerator pedal or entirely releases the pedal, thereby causing an upshift since the vehicle speed is greater than the scheduled upshift speed for the minimum throttle or pedal position. Coasting upshifts can also occur when the accelerator pedal is off and the vehicle is traveling downhill resulting in the vehicle accelerating.

In the powertrain for hybrid electric vehicles, an electric motor is located in a torque path between the engine and transmission. Power for driving the vehicle can be provided by a gasoline or diesel internal combustion engine, or by the electric motor, or by both the engine and motor. A motor in this location provides an opportunity to enhance control of engine speed.

There is a need for a method that improves closed-pedal gear shifting using an electric motor to control transmission input speed rather than a conventional engine speed control system currently used for that purpose.

SUMMARY OF THE INVENTION

A method for controlling a power-off shift from a current gear to a next gear in a hybrid electric powertrain including an engine, electric motor and automatic transmission includes the steps of determining an initial target speed for the current gear, operating the motor at the initial target speed, repetitively determining a current gear ratio, a output shaft speed during the gear ratio change, a time rate of change of output shaft speed, using the current gear ratio, the current speed of the output shaft and the time rate of change of output shaft speed repetitively to determine a current target speed, and operating the motor at the current target speed until a gear change to the next gear is completed.

The control strategy uses a high voltage motor to provide an input speed to the transmission that matches the synchronous speed in the next gear during a transmission gear shift event. A difference in the amplitude of the transmitted torque before the gear shift and after the gear shift results in a corresponding change in vehicle acceleration. Vehicle acceleration and deceleration discontinuities between the start and the end of a shift event will affect the shift feel. The control minimizes these discontinuities.

One of the advantages of this control strategy is that only powertrain operating parameters at the start and end of the gear shift need to be known; therefore, it can operate independently from the shift pressure control strategy. This is also beneficial in transmission strategies that allow skip shifts since only the current and next gear ratios are needed.

The control strategy may also reduce the effort needed to calibrate pressure, clutches and brakes during the gear shifts, since there is less torque disturbance and coordination with pressure control.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

These and other advantages will become readily apparent to those skilled in the art from the following detailed description of a preferred embodiment when considered in the light of the accompanying drawings in which.

DESCRIPTION OF THE PREFERRED EMBODIMENT

Figure 1:
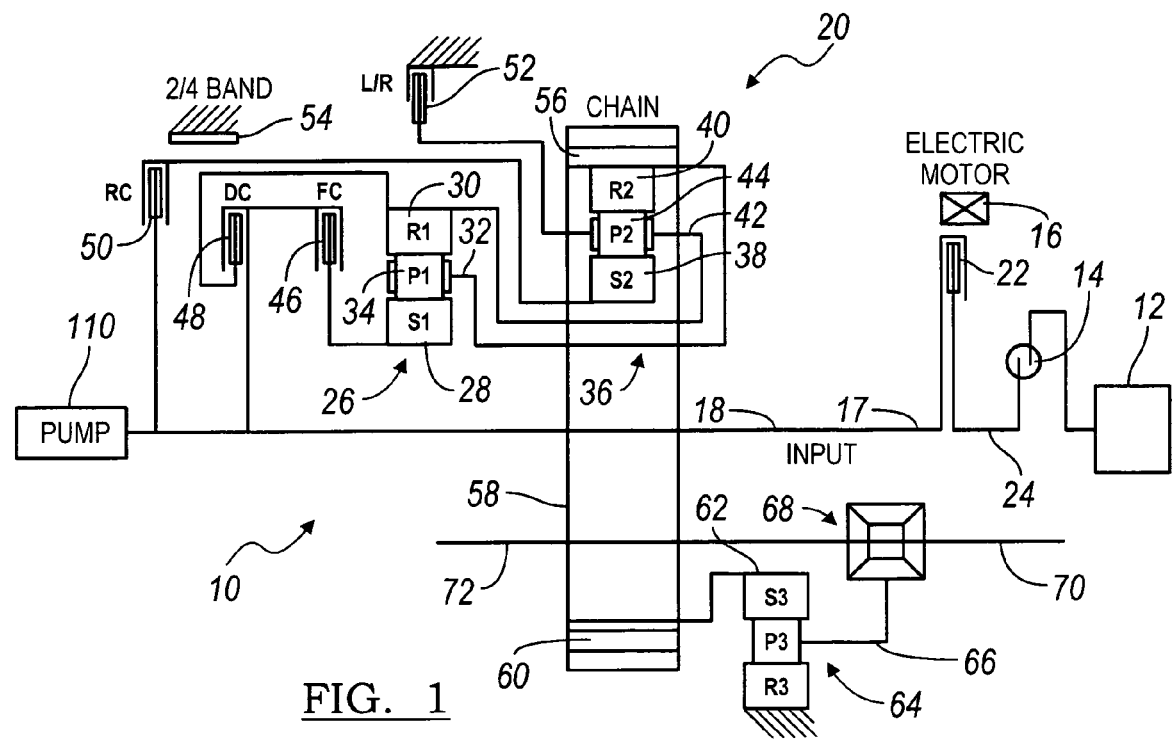
FIG. 1 is a schematic diagram showing components of a powertrain for a hybrid electric vehicle.

Referring first to FIG. 1, a powertrain 10 for a hybrid electric vehicle includes an engine 12 driveably connected through a torsion damper 14 to an electric motor 16, whose rotor shaft 17 is continuously driveably connected to the input shaft 18 of a multiple-speed automatic transmission 20. A clutch 22 alternately connects and disconnects the engine shaft 24 and the input shaft 18.

The transmission 20 includes a first planetary gear set 26, which includes a sun gear 28, ring gear 30, carrier 32, and planet pinions 34 supported on the carrier and meshing with the sun gear and ring gear. A second planetary gear set 36, which includes a sun gear 38, ring gear 40, carrier 42, and planet pinions 44 supported on carrier 42 and meshing with the sun gear 38 and ring gear 40. The transmission produces four forward gear ratios and reverse drive by selectively engaging and disengaging various control elements, which include a forward clutch 46, direct clutch 48, reverse clutch 50, low-reverse brake 52, and 2/4 brake band 54.

Ring gear 40 is the transmission output, whose speed (OSS) is continually monitored by a sensor, which produces an electronic signal representing OSS. Ring gear 40 is secured to a sprocket wheel 56, which is driveably engaged by a chain 58 that transmits rotating power to a second sprocket wheel 60. The sun gear 62 of a final drive gear set 64 is secured to sprocket wheel 60. The carrier 66 drives a differential mechanism 68, which transmits power to the vehicle wheels through shafts 70, 72.

Figure 2:
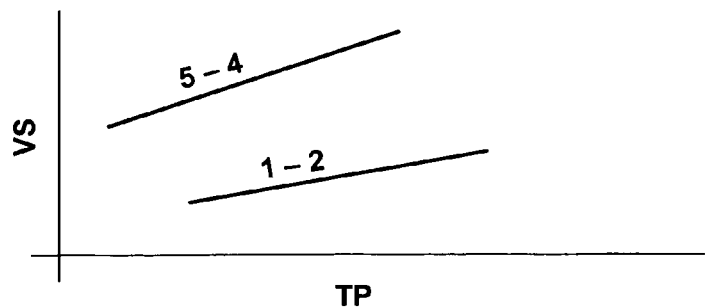
FIG. 2 is shift schedule defined in terms of vehicle speed and throttle position showing an upshift line and a downshift line where gear changes are commanded by a controller.

A smooth acceleration and deceleration trajectory profile during closed pedal gear shift events can be ensured by matching the speed of the transmission input shaft 18 to the synchronous speed in the next gear of the transmission gear shift event. Upshifts and downshifts are produced by an electronic transmission controller in response to an operation state determined with reference to current vehicle speed (VS) and throttle position (TP). The controller continually receives signal representing VS, TP, the current gear, and the speed ratio or gear ratio produced by the current gear and other gears produced by the transmission 20. Electronic memory accessible to the controller contains data such as that shown in FIG. 2, wherein, e.g., an upshift from first gear to second gear is commanded and executed automatically when the state defined by VS and TP crosses upward the 1-2 line and a downshift from fifth gear to fourth gear is commanded and executed automatically when the state defined by VS and TP crosses downward the 5-4 line. The data include for each upshift and downshift the transmission is able to produce.

Figure 3:
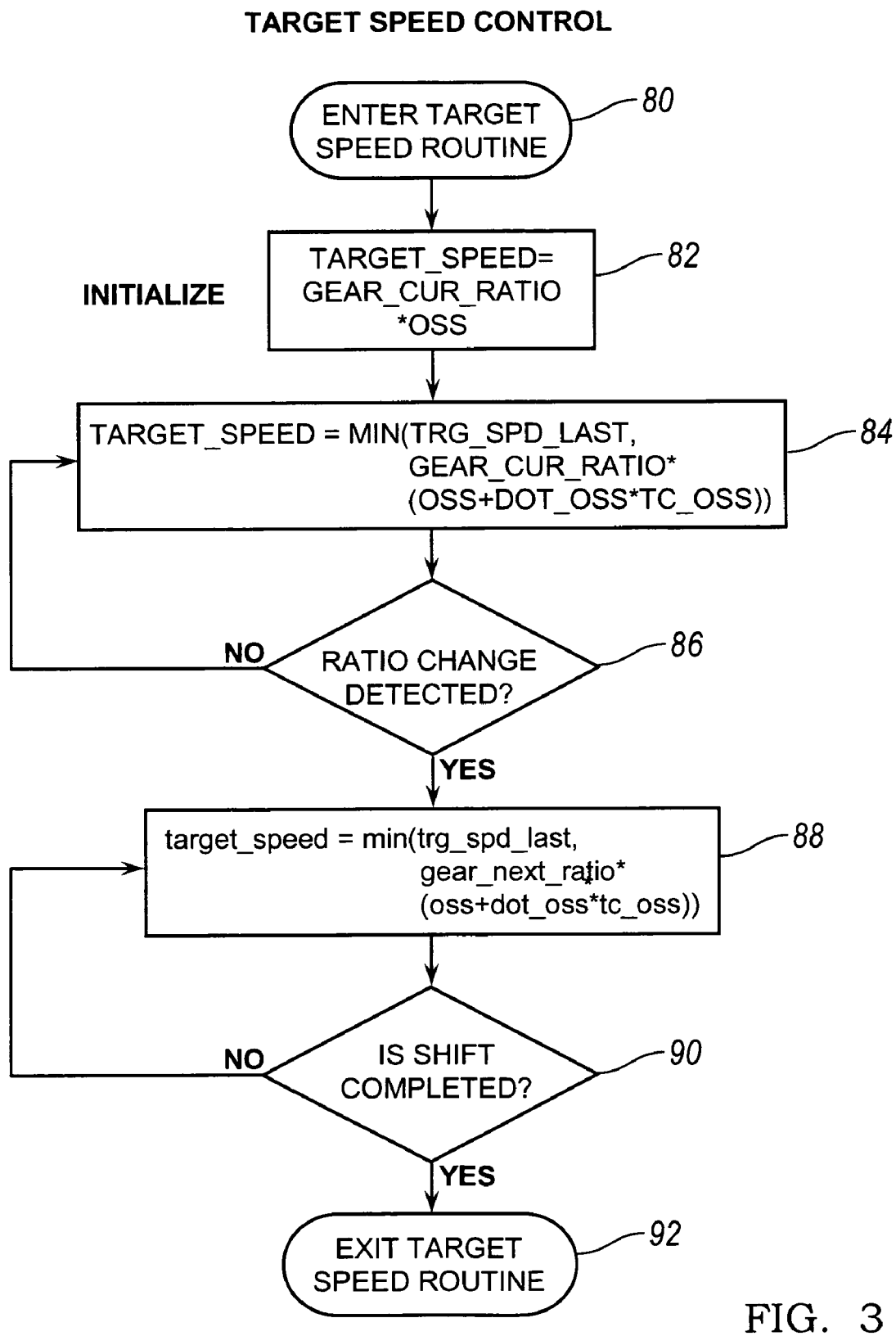
FIG. 3 is a diagram of the method steps for controlling gear changes in the powertrain of FIG. 1.

The control algorithm depicted in FIG. 3 is entered at step 80 and executed whenever a closed-pedal gear shift is commanded. At step 82, the initial commanded motor speed, which is also the initial target speed of input 18, is set to the gear ratio currently produced by the transmission in the current gear multiplied by the speed of the output 40 (OSS). That product is the synchronous speed. Speed ratio of the transmission 20 is the ratio of the speed of its input to the speed of its output. The gear ratio of the transmission 20 is the ratio of the speed of its input to the speed of its output when operating in a particular gear.

At the task execution rate of about 8 ms intervals, the target motor speed command is updated at step 84 to the smaller magnitude of either (1) the last target motor speed or (2) the current gear ratio multiplied by the sum of output shaft speed plus a speed derivative term, which is the time rate of change of OSS during a time interval, 8 ms.

At step 86 a test is made to determine whether a gear ratio change has been detected. If the test at step 86 is logically false, control returns to step 84. If the test at step 86 is logically true, at step 88 the target motor speed is updated and set equal to the smaller magnitude of either (1) the last target motor speed or (2) the product resulting from multiplying the gear ratio of the next gear to which the transmission is shifted and the sum of output shaft speed OSS plus the speed derivative term.

At step 90 a test is made to determine whether a gear ratio change to the target gear ratio has been completed. If the test at step 90 is logically false, control returns to step 88. If the test at step 90 is logically true, thereby indicating that the power-off gear shift is completed, the control is exited at step 92.

In a conventional vehicle the target speed could increase to allow engine braking during a closed-pedal gear shift. In a hybrid electric vehicle powertrain, engine braking is replaced by regenerative braking; therefore, the motor speed target will never be allowed to increase. This is why the motor speed target is clipped to the minimum of the current value and last value.

Figure 4:
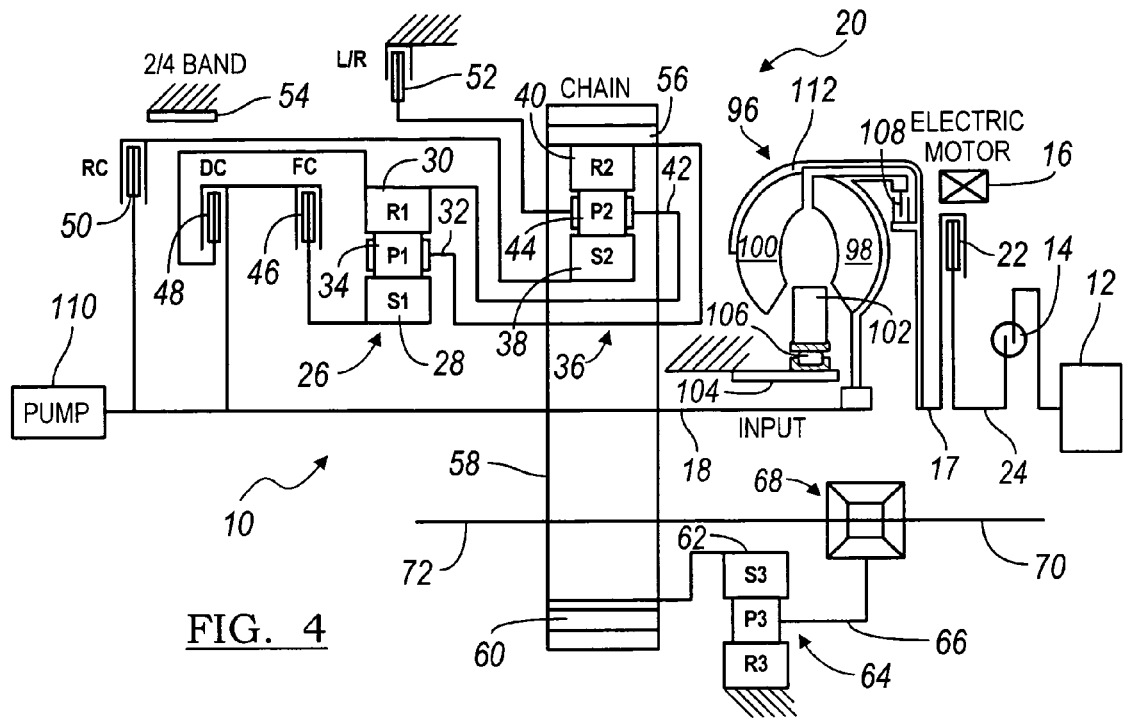
FIG. 4 is a schematic diagram showing an alternate powertrain for a hybrid electric vehicle.

Referring to FIG. 4, the powertrain 10 may have a torque converter 96 located in the torque transmission path between the electric motor 16 and transmission 20, or between the engine shaft 24 and the motor 16. In either case, the torque converter 96 includes a bladed impeller wheel 98 connected to the motor shaft, a bladed turbine wheel 100 and a bladed stator wheel 102. The impeller, stator and turbine wheels define a toroidal fluid flow circuit, whereby the impeller 98 is hydrokinetically connected to the turbine 100. The stator 102 is supported rotatably on a stationary stator sleeve shaft 104, and an overrunning brake 106 grounds the stator to the shaft 104 to prevent rotation of the stator in a direction opposite the direction of rotation of the impeller, although free-wheeling motion in the opposite direction is permitted.

The torque converter includes a lockup clutch 108 located within the torque converter impeller housing 112. When clutch 108 is engaged, the turbine and impeller are mechanically connected to the transmission input shaft 18; when clutch 108 is disengaged, the turbine and impeller are hydrokinetically connected and mechanically disconnected. Fluid contained in the torque converter 96 is supplied to the torque converter from the output of an oil pump 110 assembly and is returned to an oil sump, to which an inlet of the pump 110 is connected hydraulically.

Figure 5:
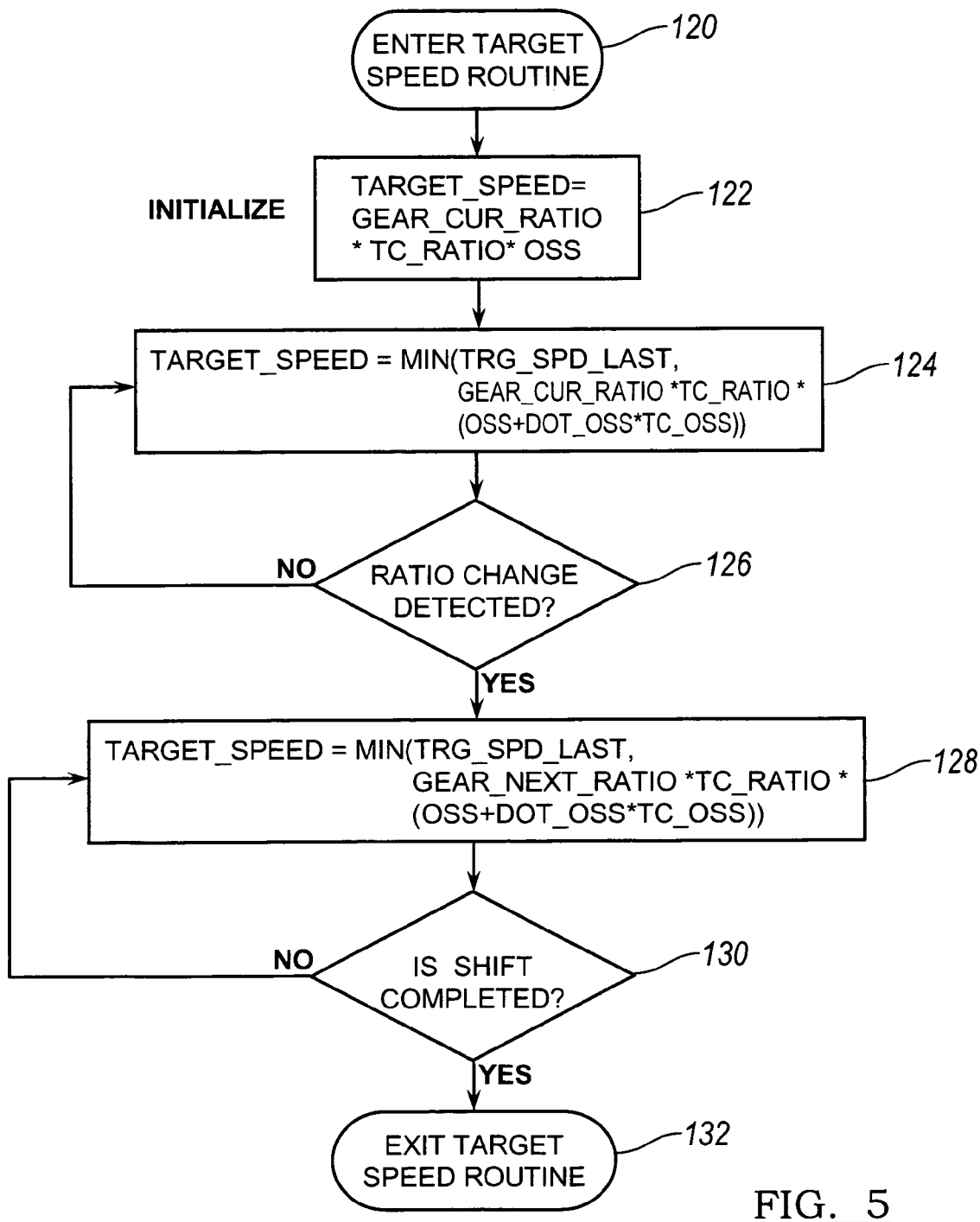
FIG. 5 is a diagram of the method steps for controlling gear changes in the powertrain of FIG. 4.

Control of the power-off shift event must account for slip across the converter 96 during the gear shift, since it will directly affect the input speed to the transmission 20. FIG. 5 shows the algorithm for a hybrid electric vehicle, whose powertrain includes a torque converter 96. The control algorithm of FIG. 5 is entered at step 120 and executed whenever a closed-pedal gear shift is commanded. At step 122, the initial commanded motor speed is set to the product of the gear ratio currently produced by the transmission in the current gear, the speed of the output 40 (OSS), and the speed ratio across the torque converter 96. Speed ratio of the torque converter 96 is the ratio of the speed of its input 17, the motor speed, to the speed of its output 18, the transmission input speed. A speed sensor on the turbine shaft 18 produces a signal representing the speed of input shaft 18.

At the task execution rate of about 8 ms intervals, the target motor speed command is updated at step 124 to the smaller magnitude of either (1) the last target motor speed or (2) the current gear ratio multiplied by the torque converter speed ratio, multiplied by the sum of output shaft speed plus a speed derivative term, which is the time rate of change of OSS during the time interval, about 8 ms.

At step 126 a test is made to determine whether a gear ratio change has been detected. If the test at step 126 is logically false, control returns to step 124. If the test at step 126 is logically true, at step 128 the target motor speed is updated and set equal to the smaller magnitude of either (1) the last target motor speed or (2) the product resulting from multiplying the gear ratio of the next gear to which the transmission is shifted, the torque converter speed ratio, and the sum of output shaft speed OSS plus the speed derivative term.

At step 130, a test is made to determine whether a gear ratio change to the next gear ratio has been completed. If the test at step 130 is logically false, control returns to step 128. If the test at step 130 is logically true, thereby indicating that the power-off gear shift is completed, the control is exited at step 132.

The algorithm may reduce the need to slip the converter to dampen the driveline, since it already reduces the torque disturbance. The electric motor speed can be controlled in either open loop or closed loop manner with clips to ensure reasonable values and for stall prevention. When a hybrid electric vehicle is coasting, the control strategy typically shuts off fuel during regenerative braking. This is an ideal situation for using the electric motor for target speed control during the coast down shifts. The target motor speed strategy will result in quicker shifts and therefore increase the duration of brake regeneration, thereby increasing the electric energy stored in the vehicle's battery.

Figure 6:
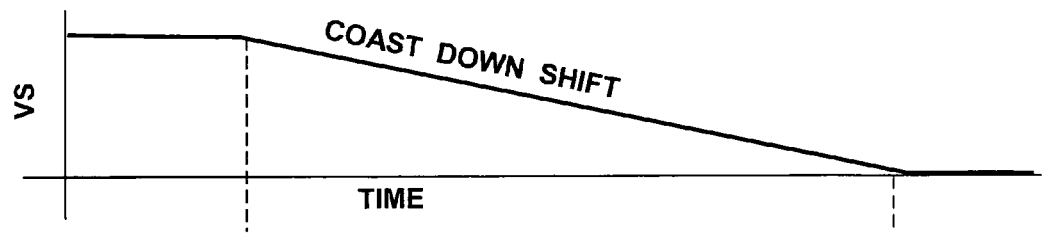
FIG. 6 is a graph that illustrates a decrease in vehicle speed during a power-off gear shift.
Figure 7:
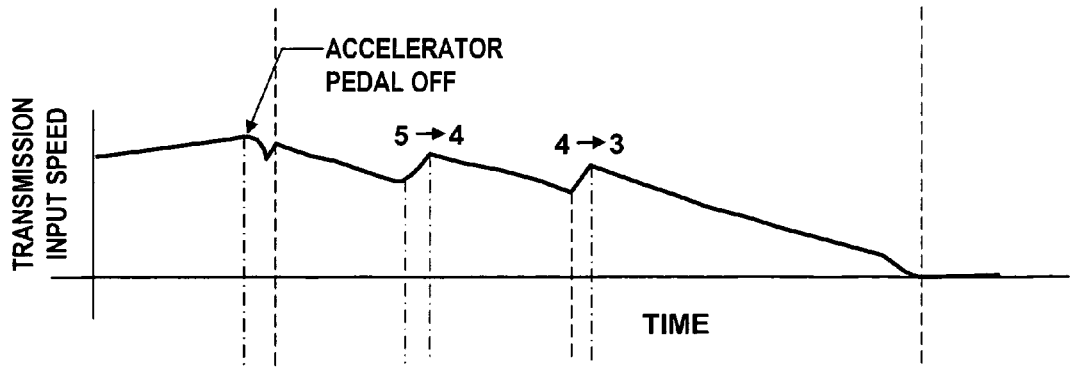
FIG. 7 is a graph that illustrates the variation of transmission input speed during a power-off gear shift.

FIG. 6 shows the decrease of vehicle speed during a power-off gear shift. FIG. 7 shows the variation of transmission input speed during a power-off gear shift, specifically a closed-pedal 5-3 downshift from fifth gear to third gear.

Figure 8:
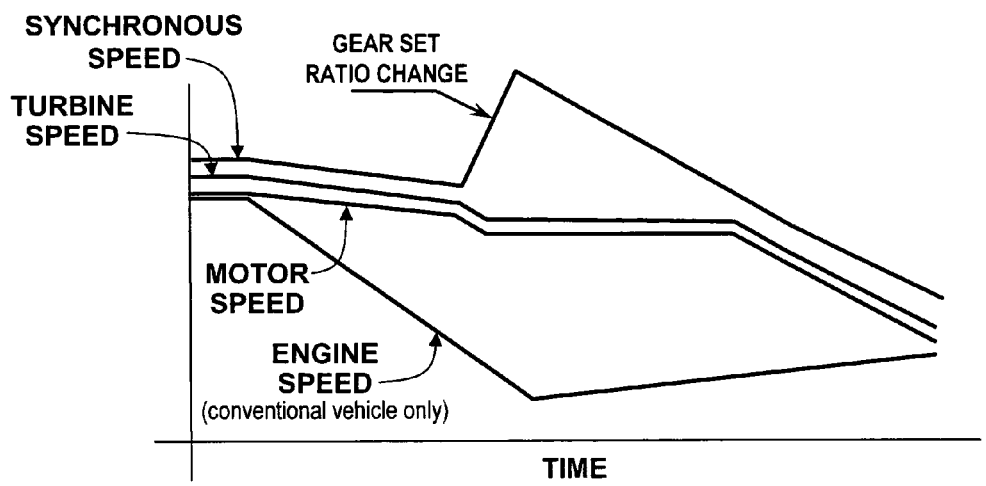
FIG. 8 is a graph that illustrates the variation of synchronous speed, turbine speed, motor speed, and engine speed during a closed-pedal downshift.

FIG. 8 is a graph that illustrates the variation of synchronous speed, turbine speed, motor speed, and engine speed during a closed-pedal downshift.

Figure 9:
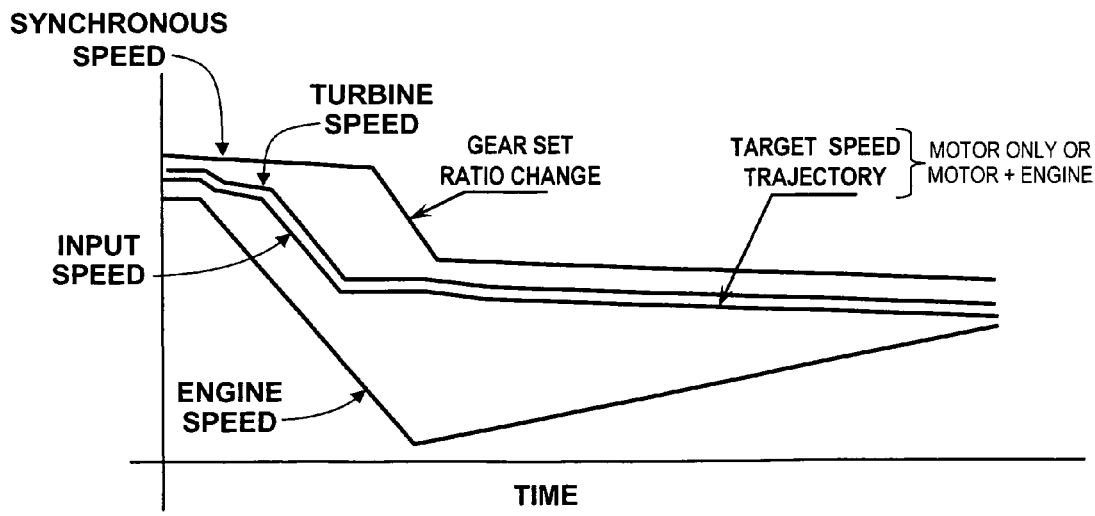
FIG. 9 is a graph that illustrates the variation of synchronous speed, turbine speed, motor speed, and engine speed during a closed-pedal upshift.

FIG. 9 is a graph that illustrates the variation of synchronous speed, turbine speed, motor speed, and engine speed during a closed-pedal upshift. During a closed pedal upshift, the engine might remain on depending on the control strategy and conditions. If the engine remains on, then the target speed will be maintained by the electric motor in addition to the engine speed. If the engine is off, then the target speed will be provided by the electric motor only.

One of the advantages of this strategy is that only the start and end of the shift need to be known. Therefore the control strategy can operate independently from the shift pressure control strategy, which is applied to the clutch and brakes. This is also beneficial in transmission strategies that allow skip shifts since only the current and next gear ratios are needed. The strategy may also reduce the calibration effort needed for pressure and clutches during the shifts, since there is less torque disturbance and coordination with pressure control.

In accordance with the provisions of the patent statutes, the preferred embodiment has been described. However, it should be noted that the alternate embodiments can be practiced otherwise than as specifically illustrated and described.

What is claimed is:

1. In a hybrid electric powertrain including an electric motor and automatic transmission, a method for controlling a power-off gear shift from a current gear to a target gear of the transmission, comprising the steps of:
(a) determining an initial target motor speed for the current gear;
(b) operating the motor at the initial target motor speed;
(c) repetitively determining a current gear ratio, a output shaft speed during the gear ratio change, a time rate of change of output shaft speed over a time interval; and
(d) using the current gear ratio, the current speed of the output shaft and the time rate of change of output shaft speed over the interval to determine repetitively a current target speed; and
(e) operating the motor at the current target motor speed until a gear shift to a next gear is detected.

2. The method of claim 1, wherein step (a) further comprises:
calculating the initial target speed as the product of the current gear ratio and the output shaft speed.

3. The method of claim 1, wherein step (d) further comprises:
determining the last target speed;
determining the current target speed as the lesser magnitude of the last target speed and ((gear_cur_ratio*(oss+dot_oss*time_oss), wherein gear_cur_ratio is the current gear ratio, oss is current output shaft speed, dot_oss is a time rate of change of output shaft speed over a time interval, time_oss.

4. The method of claim 1, further comprising:
after a gear change to the next gear is detected and before a gear change to the next gear is completed, repetitively determining a next current gear ratio, the output shaft speed during the gear change, and the time rate of change of output shaft speed; and
using the next current gear ratio, the current speed of the output shaft and the time rate of change of output shaft speed to determine repetitively a next current target speed; and
(e) operating the motor at the next current target motor speed until a gear shift to the target gear is completed.

5. In a hybrid electric powertrain including an electric motor and automatic transmission, a method for controlling a power-off gear shift from a current gear to a target gear, comprising the steps of:
(a) determining an initial target motor speed for the current gear;
(b) operating the motor at the initial target speed;
(c) repetitively determining a current gear ratio, a current speed ratio of the torque converter, an output shaft speed during the gear ratio change, a time rate of change of output shaft speed over a time interval; and
(d) using the current gear ratio, the current speed ratio of the torque converter, the current speed of the output shaft and the time rate of change of output shaft speed over the interval to determine repetitively a current target motor speed; and
(e) operating the motor at the current target motor speed until a gear shift to a next gear is detected.

6. The method of claim 5, wherein step (a) further comprises:
calculating the initial target motor speed as the product of the current gear ratio and the output shaft speed.

7. The method of claim 5, wherein step (d) further comprises:
determining the last target motor speed;
determining the current target speed as the lesser magnitude of the last target speed and ((gear_cur_ratio*TC_ratio*(oss+dot_oss*time_oss), wherein gear_cur_ratio is the current gear ratio, TC_ratio is the current speed ratio of the torque converter, oss is current output shaft speed, dot_oss is a time rate of change of output shaft speed during a time interval, time_oss.

8. The method of claim 5, further comprises:
after a gear change to the next gear is detected and before a gear change to the next gear is completed, repetitively determining a next current gear ratio, the current speed ratio of the torque converter, the output shaft speed during the gear change, and the time rate of change of output shaft speed; and
using the next current gear ratio, the current speed ratio of the torque converter, the current speed of the output shaft, and the time rate of change of output shaft speed to determine repetitively a next current target motor speed; and (e) operating the motor at the next current target speed until a gear shift to the target gear is completed.

9. In a hybrid electric powertrain including an electric motor and automatic transmission, a method for controlling a power-off gear shift from a current gear to a target gear of the transmission, comprising the steps of:

(a) operating the motor at the synchronous speed that corresponds to a gear ratio of the current gear in which the transmission is operating;

(b) repetitively determining the current gear ratio, an output shaft speed during the gear shift, and a time rate of change of the output shaft speed over a time interval; and (c) using the current gear ratio, the current speed of the output shaft and the time rate of change of the output shaft speed over the time interval to determine repetitively a current target motor speed;

(d) operating the motor at the current target motor speed until a gear change to a next gear is detected; and (e) repeating step (b) and step (c) for the next gear; and (f) operating the motor at the current target motor speed until a gear change to the target gear is completed.

10. The method of claim 9, wherein step (a) further comprises:

calculating the synchronous speed as the product of the current gear ratio and the output shaft speed.

11. The method of claim 9, wherein step (a) further comprises:

calculating the synchronous speed as the product of the current gear ratio, current speed ratio of a torque converter of the transmission, and the output shaft speed.

12. The method of claim 9, wherein step (c) further comprises:

determining a last target motor speed; and determining the current target speed as the lesser magnitude of the last target speed and ((gear_cur_ratio*TC_ratio*(oss+dot_oss*time_oss), wherein gear_cur_ratio is the current gear ratio, TC_ratio is the current speed ratio of a torque converter, oss is current output shaft speed, dot_oss is a time rate of change of output shaft speed during a time interval, time_oss.

13. The method of claim 9, wherein step (c) further comprises:

determining the last target speed; and determining the current target speed as the lesser magnitude of the last target speed and ((gear_cur_ratio*(oss+dot_oss*time_oss), wherein gear_cur_ratio is the current gear ratio, oss is current output shaft speed, dot_oss is a time rate of change of output shaft speed over a time interval, time_oss.

* * * * *